US012049602B1

(12) United States Patent
Madrid

(10) Patent No.: US 12,049,602 B1

(45) Date of Patent: Jul. 30, 2024

(54) SYSTEM FOR REMOVAL OF LIME SCALE

(71) Applicant: Johnny Jesse Madrid, Mission Viejo, CA (US)

(72) Inventor: Johnny Jesse Madrid, Mission Viejo, CA (US)

( * ) Notice: Subject to any disclaimer, the term of this patent is extended or adjusted under 35 U.S.C. 154(b) by 299 days.

(21) Appl. No.: 17/389,069

(22) Filed: Jul. 29, 2021

(51) Int. Cl.

| | |
|---|---|
| ***B08B 3/04*** | (2006.01) |
| ***C11D 1/04*** | (2006.01) |
| ***C11D 3/04*** | (2006.01) |
| ***C11D 3/37*** | (2006.01) |
| ***C11D 3/50*** | (2006.01) |
| ***C11D 7/08*** | (2006.01) |
| ***C11D 17/06*** | (2006.01) |

(52) U.S. Cl.
CPC .............. *C11D 1/04* (2013.01); *C11D 3/3715* (2013.01); *C11D 17/06* (2013.01); *C11D 3/50* (2013.01); *C11D 2111/24* (2024.01)

(58) Field of Classification Search
CPC ......... B08B 3/04; B08B 7/0028; C11D 3/042; C11D 3/2075; C11D 3/37; C11D 3/50; C11D 7/08; C11D 11/0052
See application file for complete search history.

(56) References Cited

U.S. PATENT DOCUMENTS

2019/0091732 A1* 3/2019 Pung ..................... C08G 12/32

* cited by examiner

*Primary Examiner* — Brian P Mruk
(74) *Attorney, Agent, or Firm* — Plager Schack LLP; Mark H. Plager; Naomi Mann

(57) ABSTRACT

Disclosed is a system for removal of limescale from a surface, which provides a sheet infused with a descaling agent and a binding agent comprising a polyacrylate salt, wherein the polyacrylate salt causes the sheet to bind to a surface to effectuate removal of the limescale. In embodiments, the sheet may bind to a vertical surface for treatment of limescale.

8 Claims, 2 Drawing Sheets

100

102

Applying a sheet infused with a descaling agent and a binding agent, to a surface

SYSTEM FOR REMOVAL OF LIME SCALE

BACKGROUND

The present invention generally relates to a method and system for limescale removal, and in particular to a method of limescale removal from a vertical surface.

Limescale (also referred to as 'scale' or 'lime') is a hard chalky deposit, typically comprising calcium carbonate ($CaCO_3$), that may build up on surfaces which are in contact with hard water. Limescale may be unsightly and hard to clean, particularly where it has built up over a long period of time. While descaling agents, scrubbing, and/or sand-blasting may be used to remove limescale, effective application may be laborious, time consuming, and expensive, and may fail to achieve complete removal. Additionally, abrasive cleaning tools and/or harsh chemicals that are used in some cases may be damaging to the surface and/or the environment. Furthermore, limescale accumulating in swimming pools may require the pool to be drained for removal of scale that has built up below the water level of the pool. As a result, many households and building owners may struggle with maintenance to prevent the buildup of limescale, and/or let the unsightly scale deposit remain.

As such, there is a need for an improved system that overcomes the above deficiencies, and provides an efficient, easy, and cost effective way to treat and remove limescale.

SUMMARY

According to various embodiments, disclosed is a system for removal of limescale from a surface, which provides a sheet infused with a descaling agent and a binding agent comprising a polyacrylate salt, wherein the polyacrylate salt causes the sheet to bind to the surface to effectuate removal of the limescale.

In embodiments, the disclosed system provides a method for treating or removing limescale from a surface, which may comprise applying a sheet infused with a descaling agent and a binding agent to the surface, the binding agent comprising polyacrylate salt, wherein the binding agent causes the sheet to adhere to the surface. In certain embodiments, the descaling agent may comprise acetic acid. In some embodiments, the method may further comprise infusing the sheet with the descaling agent and with the binding agent prior to application. In certain embodiments, applying the infused sheet may comprise wetting the sheet, and pressing the sheet onto the surface. In some further embodiments, the surface may be a vertical surface, and/or a surface submerged under water.

In certain embodiments, the disclosed system provides a composition for the treatment of limescale, which may comprise a descaling agent, and a binding agent comprising a polyacrylate salt, wherein the binding agent is present in the composition in an amount effective for enabling a sheet infused with the composition to adhere to a vertical surface without slipping off, and wherein the descaling agent is present in the composition in an amount effective for removing lime scale buildup from said vertical surface. In some embodiments, the descaling agent may comprise acetic acid, and the binding agent may comprise sodium polyacrylate. In some embodiments, the composition may further comprise a hydrophobic liquid, and water.

According to certain embodiments, the disclosed system further provides an apparatus for the treatment of lime scale, the apparatus comprising a sheet infused with a descaling agent and a binding agent, the binding agent comprising a polyacrylate salt, wherein the binding agent is present in an amount effective for enabling the sheet to adhere to a vertical surface substantially without slipping when said sheet is wet, and wherein the descaling agent is present in an amount effective for removing lime scale buildup from said vertical surface, when said sheet is adhered to the surface. In some embodiments, the descaling agent may comprise acetic acid, and the binding agent may comprise sodium polyacrylate. In some embodiments, the sheet may further be infused with a hydrophobic liquid.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
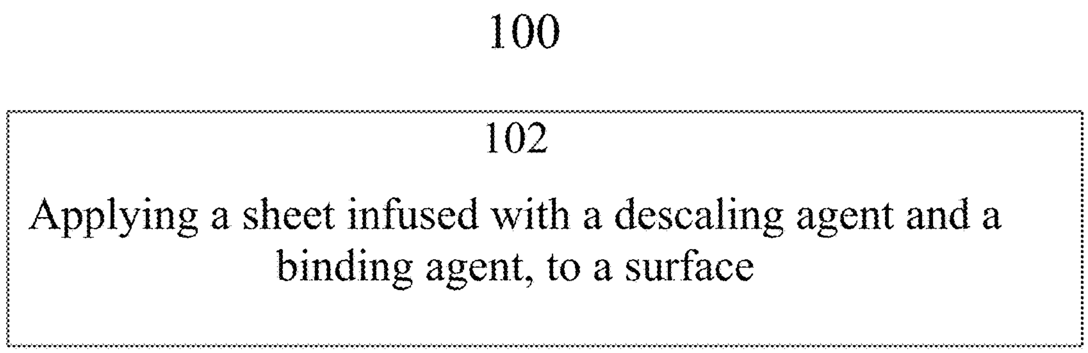
FIG. 1 depicts a method for the treatment of limescale, according to various embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Removal of limescale buildup from a surface may be a laborious, time consuming, and costly process. While some treatment methods may comprise application of a descaling agent to the surface, the descaling agent may slip off a vertical surface due to gravity. As such, the descaling agent may need to be scrubbed and/or continuously applied to the surface for effective removal. The disclosed subject matter provides a system which enables the descaling agent to remain on the surface for a prolonged period, permitting it to effectively dissolve and/or loosen limescale, thus greatly reducing the amount of human effort needed.

According to various embodiments, a method 100 for treating or removing limescale from a surface, comprises applying a substrate (sheet) infused with a treatment composition that includes an effective amount of a descaling agent and a binding agent comprising a polyacrylate salt to the surface (step 102). In embodiments, the binding agent causes the sheet to adhere to the surface substantially without slipping, to permit the descaling agent to effectuate removal of the limescale. In embodiments, the substrate may be a thin sheet that may be made of a material such as natural or synthetic fabric, e.g. cotton, or other light porous material.

According to certain embodiments, the surface may be a vertical surface. In certain embodiments, the surface may be a non-porous surface. Such surface may be, for example, non-porous waterline swimming pool or spa tiles, glass shower doors or enclosures, and the like. In certain embodiments, the surface may be partially or fully submerged in water, such as the case for a swimming pool. It should be understood that the disclosed method may be used for removal of limescale from other surfaces, including horizontal surfaces, curved or bent surfaces, etc. according to various embodiments. Once the infused sheet has been applied to the surface, the polyacrylate salt causes the sheet to cling to the surface, and to remain on the surface. This allows for continuous dissolving and/or loosening of the limescale, without further human effort such as scrubbing.

In embodiments, the substrate, i.e. sheet, may be infused with the treatment composition prior to application. In some embodiments, infusing the sheet may comprise dipping the sheet into the treatment composition, to saturate the sheet with the composition. The sheet may then be allowed to dry in order to complete the infusion process. According to certain embodiments, the infused sheet may be provided to the end user. In certain embodiments, the infused sheet may be a cotton sheet. In other embodiments, the end user may infuse the sheet prior to use. In some embodiments, the sheet may be cut to a size and/or shape appropriate to the surface and/or area to be treated. In other embodiments, one or more sheets of a pre-determined size may be applied to the surface. According to an exemplary embodiment, the sheet may be approximately 10 inches or approximately 20 inches in width, and about 10 feet in length, for treatment of large surfaces such as the wall of a swimming pool or shower, or the sheet may be cut for treatment of smaller surfaces. It should be understood that the size and shape of the sheet may vary according to alternate embodiments, and that application and use of the sheet may be customizable for end users.

In embodiments, the sheet, may be applied by pressing it onto the surface, e.g. using hand/finger pressure against the sheet, so that it clings onto the surface to be treated. In some embodiments, a user may wet the sheet in order to activate clinging of the sheet to the surface and/or the descaling process. For example, the user may spray water and/or an aqueous solution (as will be described) onto the sheet for activation. This step may be performed prior to and/or in conjunction with pressing the sheet into the surface. In some further embodiments, a sheet or a portion of the sheet may be applied to a vertical wall which is under water, which activates the sheet enabling it to cling onto the surface for treatment of limescale, while submerged. In some embodiments, the sheet may be applied right after it has been soaked in treatment composition, i.e. before it has been allowed to dry. The user may leave the sheet on the surface for a prolonged time period, to allow the activated descaling agent to dissolve and/or loosen lime scale build-up. In embodiments, the sheet may be left on the surface for several hours, or for one or more days. The user may then remove the sheet, and wipe the surface to remove any remaining residue. In embodiments, the sheet may be reapplied until all of the limescale has been removed.

Composition

In embodiments, the disclosed treatment composition may comprise a descaling agent in combination with a binding agent which may be a polyacrylate salt. The treatment composition may further comprise a hydrophobic liquid, and water as a carrier medium. In certain embodiments, the composition, when not infused into the sheet, may be in the form of a gel or slurry. It should be understood that as the sheet is dried during the infusion process, the infused sheet contains substantially less water, if any, in comparison to the non-infused composition.

In embodiments, the binding agent may be present in the composition in an amount effective for enabling a sheet infused with the composition to adhere to a vertical surface without slipping off. In embodiments, the binding agent may preferably comprise sodium polyacrylate. However, other polyacrylate slats, such as potassium, lithium and ammonium salts may also be used in alternate embodiments.

Additionally, the descaling agent may be present in the composition in an amount effective for removing lime scale buildup from the vertical surface during application of the infused sheet, while leaving the surface undamaged. In embodiments, the descaling agent may preferably comprise acetic acid. However, other descaling agents, including but not limited to citric acid, glycolic acid, formic acid, lactic acid, phosphoric acid, sulfamic acid, and hydrochloric acid, may also be used in alternate embodiments.

In certain embodiments, the composition may include a hydrophobic liquid, which may comprise an essential oil, to dilute or minimize acetic acid odor and provide a pleasant aroma.

In certain embodiments, the disclosed treatment composition may comprise: acetic acid in an amount by weight based on total weight of composition of between about 4% to about 9%, or about 5% to about 8%, or about 6% to about 7%, or about 6.5%. The composition may further comprise sodium polyacrylate in an amount by weight based on total weight of composition of between about 1% to about 3%, or about 2%. The composition may further comprise essential oil in an amount by weight based on total weight of composition of between about 0.05% to about 1%; or between about 0.1% to about 0.5%, or about 0.2%. The composition may further comprise water in an amount by weight based on total weight of composition of between about 85% to about 95%, or about 90%. According to an exemplary embodiment, the treatment composition may comprise 2.1% by weight of sodium polyacrylate; 6.5% by weight of acetic acid; 0.21% of essential oil; and 91% by weight of water, which may be blended together (e.g. in a mixing tank) to produce a gel or slurry. In embodiments, a weight ratio of the sodium polyacrylate to acetic acid in a dry sheet may be between about 1:4 to about 1:2, or approximately 1:3.

In certain embodiments, the treatment composition may be infused into a fabric sheet. In embodiments, infusing the composition may comprise soaking the sheet in the composition, and allowing the sheet to fully dry. The dried infused sheet may then be applied to a surface, by wetting the sheet with water and/or an aqueous solution, to activate the infused composition. This causes the sheet to adhere to the vertical surface while effectuating removal of lime scale buildup from the surface. In embodiments, an aqueous solution which may be used for wetting/activating the sheet may be an aqueous descaling composition, that may comprise ingredients similar to those of the treatment composition, but without the polyacrylate salt. Such composition may comprise, for example, acetic acid in an amount based on weight of total composition of between about 4% to about 9%; essential oil in an amount based on weight of total composition of between about 0.05% to about 1%; and water in an amount based on weight of total composition of between about 85% to about 95%.

The disclosed system was found to be effective in removing light lime scale buildup after application of the sheet for approximately an hour. In cases of heavy buildup the sheet may be applied for a longer time period, and may be reapplied if needed. In all cases, human effort and time in applying the sheet, i.e. wetting and pressing the sheet onto the surface, and removing the sheet and wiping off residue after application, may take about one to two minutes per application. Additionally, the disclosed system was found to be safe and effective for use in pools, ant to have virtually no impact on chemistry of the pool.

EXAMPLE/RESULTS

Figure 2:
FIG. 2 is a photo of a pool wall with limescale buildup.
Figure 3:
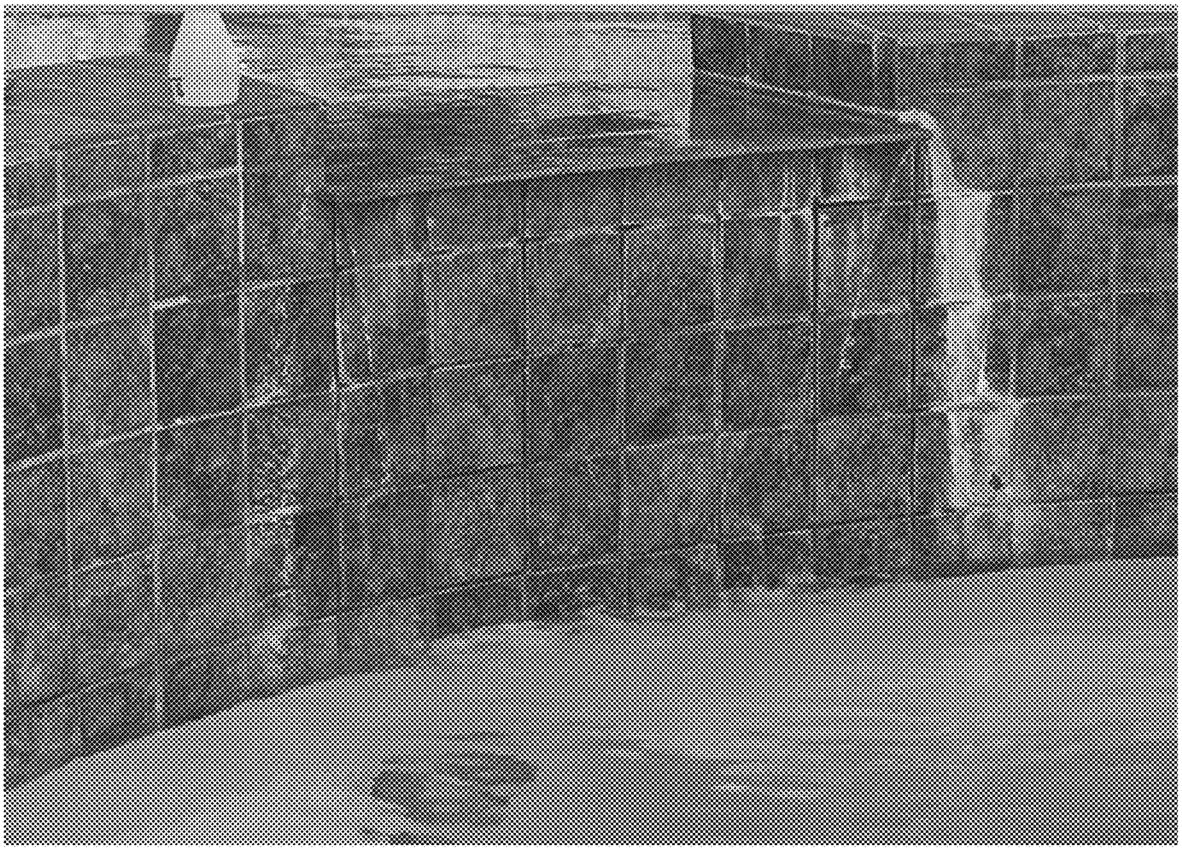
FIG. 3 shows the pool wall of FIG. 2, wherein one side of the wall was treated to remove the limescale buildup.

The disclosed system was used for treating the non-porous wall tile of a swimming pool, shown in FIGS. 2 and 3, which had heavy limescale buildup that had baked on for several years. The left side wall was treated, while the right side was left untreated.

A treatment composition was produced by mixing together the following ingredients: about 8 ounces of water; about 24 ounces of 6% acetic acid; about 60 drops of essential oil; and about 20 grams of sodium polyacrylate. A thin cotton sheet about 20 inches wide by about 10 feet long was soaked in the composition, then removed and allowed to dry for about 24 hours. The sheet was then applied to the left side wall of the pool tile, wherein a portion of the treated wall tile was under water. The sheet was applied by spraying the portion of the sheet that was above water with an aqueous solution to wet the sheet (the underwater portion was wet by the pool water), and pressing the sheet against the pool wall. The aqueous solution used to wet the sheet was formulated by mixing together about 4 ounces of water; about 12 ounces of 6% acetic acid; and about 30 drops of essential oil. This process was repeated for 5 days, where the sheet was left on for about 24 hours for each application, and the surface was wiped after removal of the sheet for each application.

As shown in FIG. 3, the left side of the pool was entirely cleared of the heavy limescale buildup (which can be seen in FIG. 2 before treatment), in contrast to the left side which remained untreated. The treatment process took 5 applications, as the buildup was heavy. The entire process required less than 10 minutes in human effort, as opposed to many hours of effort required for conventional methods such as scrubbing, sand blasting, and the like. Additionally, the underwater portion of the pool was successfully treated without draining the pool.

The disclosed system may be used for application of various agents to a vertical surface, according to alternate embodiments. The disclosed system may also be used for treatment of surfaces in hard to reach places. Additionally, the composition of the disclosed system may include other active or non-active components, including but not limited to carrier components, viscosity modifying agents, emollients, surfactants, solubilizing agents, preservatives, fragrance, stabilizing agents, pH adjustors, absorbents, anti-caking agents, slip modifiers, various solvents, solubilizing agents, denaturants, bulking agents, suspending agents, colorants, etc.

Although the invention has been explained in relation to its preferred embodiment, it is to be understood that many other possible modifications and variations can be made without departing from the spirit and scope of the invention as hereinafter claimed.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A method for treating or removing limescale from a surface, the method comprising:

applying a sheet infused with a descaling agent and a binding agent to the surface, the binding agent comprising polyacrylate salt, wherein the binding agent causes the sheet to adhere to the surface;

wherein the method further comprises infusing the sheet with the descaling agent and with the binding agent prior to application, wherein infusing the sheet comprises dipping the sheet into a treatment composition comprising said descaling agent and said binding agent, to saturate the sheet with the treatment composition, said treatment composition comprising:

acetic acid in an amount based on weight of total composition of between about 4% to about 9%;

essential oil in an amount based on weight of total composition of between about 0.05% to about 1%;

sodium polyacrylate in an amount based on weight of total composition of between about 1% to about 3%; and water in an amount based on weight of total composition of between about 85% to about 95%.

2. The method of claim 1, wherein applying the sheet comprises: wetting the sheet, and pressing the sheet onto the surface.

3. The method of claim 2, wherein wetting the sheet comprises applying water and/or an aqueous descaling composition to the sheet.

4. A method for treating or removing limescale from a surface, the method comprising:

applying a sheet infused with a descaling agent and a binding agent to the surface, the binding agent comprising polyacrylate salt, wherein the binding agent causes the sheet to adhere to the surface, wherein applying the sheet comprises wetting the sheet, and pressing the sheet onto the surface, wherein wetting the sheet comprises applying water and/or an aqueous descaling composition to the sheet, wherein the aqueous descaling composition comprises:

acetic acid in an amount based on weight of total composition of between about 4% to about 9%;

essential oil in an amount based on weight of total composition of between about 0.05% to about 1%; and water in an amount based on weight of total composition of between about 85% to about 95%.

5. The method of claim 4, wherein a weight ratio of the polyacrylate salt to acetic acid in the sheet may be between about 1:4 to about 1:2.

6. The method of claim 4, further comprising infusing the sheet with the descaling agent and with the binding agent prior to application, wherein infusing the sheet comprises dipping the sheet into a treatment composition comprising said descaling agent and said binding agent, to saturate the sheet with the treatment composition.

7. The method of claim 6, wherein infusing the sheet further comprises drying the sheet after dipping it into the treatment composition.

8. The method of claim 4, wherein said surface is a vertical surface, and/or a surface submerged under water.

* * * * *